(12) United States Patent
Shih

(10) Patent No.: US 7,852,566 B2
(45) Date of Patent: Dec. 14, 2010

(54) SINGLE F-THETA LENS USED FOR MICRO-ELECTRO MECHANICAL SYSTEM (MEMS) LASER SCANNING UNIT

(75) Inventor: Bo-Yuan Shih, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 16 days.

(21) Appl. No.: 12/355,479

(22) Filed: Jan. 16, 2009

(65) Prior Publication Data
US 2009/0244671 A1    Oct. 1, 2009

(30) Foreign Application Priority Data
Mar. 26, 2008    (TW) .............................. 97110892 A

(51) Int. Cl.
G02B 3/00    (2006.01)
G02B 26/08    (2006.01)

(52) U.S. Cl. .................................... 359/662; 359/206.1

(58) Field of Classification Search ............. 359/206.1, 359/662, 708, 718, 719
See application file for complete search history.

(56) References Cited

U.S. PATENT DOCUMENTS

| | | | |
|---|---|---|---|
| 6,295,116 B1 | 9/2001 | Eom | |
| 6,377,293 B2 | 4/2002 | Koh et al. | |
| 6,844,951 B2 | 1/2005 | Cannon et al. | |
| 6,956,597 B2 | 10/2005 | Bush et al. | |
| 7,064,876 B2 | 6/2006 | Cannon et al. | |
| 7,079,171 B2 | 7/2006 | Sung et al. | |
| 7,184,187 B2 | 2/2007 | Cannon et al. | |
| 7,190,499 B2 | 3/2007 | Deng et al. | |
| 2006/0033021 A1 | 2/2006 | Chee | |
| 2006/0279826 A1 | 12/2006 | Kim | |
| 2007/0008401 A1 | 1/2007 | Cannon et al. | |

FOREIGN PATENT DOCUMENTS

| | | |
|---|---|---|
| JP | 2006201350 | 8/2006 |
| TW | I198966 | 3/2004 |
| TW | M253133 | 12/2004 |

*Primary Examiner*—Scott J Sugarman
(74) *Attorney, Agent, or Firm*—WPAT, P.C.; Anthony King

(57) ABSTRACT

A single f-θ lens used for a micro-electro mechanical system (MEMS) laser scanning unit is in a meniscus shape formed by the lens in which a concave surface faces towards the side of a MEMS reflecting mirror. The single f-θ lens has a first optical surface and a second optical surface, at least one optical surface is aspherical surface in both main scanning direction and sub scanning direction, and satisfies specifical optical conditions. The single f-θ lens converts the nonlinear relationship between scanned angle and the time into the linear relationship between the imaged spot distances and the time. Meanwhile, the single f-θ lens focuses the scan light to the target in the main scanning and sub scanning directions, such that the purpose of the scanning linearity effect and the high resolution scanning can be achieved.

4 Claims, 12 Drawing Sheets

SINGLE F-THETA LENS USED FOR MICRO-ELECTRO MECHANICAL SYSTEM (MEMS) LASER SCANNING UNIT

BACKGROUND OF THE INVENTION

1. Field of the Invention

The present invention relates to a single fθ lens used for a micro-electro mechanical system (MEMS) laser scanning unit (LSU), and more particularly to a single fθ lens using an angular change that varies with time in a sinusoidal relation for correcting a MEMS reflecting mirror having a simple harmonic movement in order to achieve the scanning linearity effect required by a laser scanning unit.

2. Description of the Related Art

At present, a laser scanning unit (LSU) used by a laser beam printer (LBP) controls a laser beam scanning by a high-speed rotating polygon mirror as disclosed in U.S. Pat. Nos. 7,079,171, 6,377,293 and 6,295,116 or Taiwan (R.O.C.) Pat. No. 1198966, and the principles of the inventions are described as below: a semiconductor laser emits a laser beam through a collimator and an aperture to form parallel beams. After the parallel beams pass through a cylindrical lens, the beams are focused at the width of the X-axis in the sub scanning direction and along a direction parallel to the Y-axis of the main scanning direction to form a line image and projected onto a high-speed rotating polygon mirror. The polygon mirror includes a plurality of continuous reflecting mirrors disposed substantially at or proximate to the focusing position of the line image. The polygon mirror is provided for controlling the direction of projecting the laser beam, so that when a plurality of continuous reflecting mirrors are rotated at a high speed, the laser beam projected onto a reflecting mirror can be extended in a direction parallel to the main scanning direction (Y-axis) at the same angular velocity and deviated and reflected onto a fθ linear scanning lens. The fθ linear scanning lens is installed next to the polygon mirror and can be either a single-element lens structure (or a single-element scanning lens) or a two-element lens structure. The function of this fθ linear scanning lens is to focus a laser beam reflected by the reflecting mirror of the polygon mirror and projected onto the fθ lens into an oval spot that is projected onto a photoreceptor (or a photoreceptor drum, which is an image surface) to achieve the requirement of the scanning linearity. However, the traditional laser scanning unit LSU still has the following drawbacks in its practical use.

(1) The manufacture of the rotating polygon mirror incurs a high level of difficulty and a high cost, and thus increasing the manufacturing cost of the LSU.

(2) The polygon mirror requires a function of a high-speed rotation (such as 40000 rpm) and a high precision, and thus a cylindrical lens is required and installed to the traditional LSU since the width of a general polygon mirror along the Y-axis of the reflecting surface of the mirror is very thin, so that the laser beam passing through the cylindrical lens can be focused and condensed into a line (or a spot on the Y-axis) and projected onto the reflecting mirror of the polygon mirror. Such arrangement increases the number of components and also complicates the assembling operation procedure.

(3) The traditional polygon mirror requires a high-speed rotation (such as 40000 rpm), and thus the noise level is raised. Furthermore, the polygon mirror takes a longer time to be accelerated from a starting speed to a working speed, and thus increasing the time of warming up the laser scanner.

(4) When fabricating the traditional LSU, the central axis of a laser beam projected onto the reflecting mirror of the polygon mirror is not aligned precisely with the central rotating axis of the polygon mirror, so that it is necessary to take the deviation of the polygon mirror into consideration for the design of the fθ lens, and thus increasing the difficulty of design and manufacturing the fθ lens.

In recent years, an oscillatory MEMS reflecting mirror is introduced to overcome the shortcomings of the traditional LSU assembly and replace the laser beam scanning controlled by the traditional polygon mirror. The surface of a torsion oscillator of the MEMS reflecting mirror comprises a reflecting layer, and the reflecting layer is oscillated for reflecting the light and further for the scanning. In the future, such arrangement will be applied in a laser scanning unit (LSU) of an imaging system, a scanner or a laser printer, and its scanning efficiency is higher than the traditional rotating polygon mirror. As disclosed in the U.S. Pat. Nos. 6,844,951 and 6,956,597, at least one driving signal is generated, and its driving frequency approaches the resonant frequency of a plurality of MEMS reflecting mirrors, and the driving signal drives the MEMS reflecting mirror to produce a scanning path. In U.S. Pat. Nos. 7,064,876, 7,184,187, 7,190,499, 2006/0033021, 2007/0008401 and 2006/0279826 or Taiwan (R.O.C.) Pat. No. M253133 or Japan Pat. No. 2006-201350, a MEMS reflecting mirror installed between a collimator and a fθ lens of a LSU module replaces the traditional rotating polygon mirror for controlling the projecting direction of a laser beam. The MEMS reflecting mirror features the advantages of small components, fast rotation, and low manufacturing cost. However, after the MEMS reflecting mirror is driven by the received voltage for a simple harmonic movement with a sinusoidal relation of time and angular speed, and a laser beam projected on the MEMS reflecting mirror is reflected with a relation of reflecting angle θ(t) and time t as follows:

$$\theta(t) = \theta_s \cdot \sin(2\pi \cdot f \cdot t) \quad (1)$$

wherein f is the scanning frequency of the MEMS reflecting mirror, and $\theta_s$ is the maximum scanning angle at a single side (symmetrical with the optical Z axis) after the laser beam passes through the MEMS reflecting mirror.

In the same time interval Δt, the corresponding variation of the reflecting angle is not the same but decreasing, and thus constituting a sinusoidal relation with time. In other words, the variation of the reflecting angle in the same time interval Δt is $\Delta\theta(t) = \theta_s \cdot (\sin(2\pi \cdot f \cdot t_1) - \sin(2\pi \cdot f \cdot t_2))$, which constitutes a nonlinear relation with time. If the reflected light is projected onto the target from a different angle, the distance from each spot will be different in the same time interval due to the different angle.

Since the angle of the MEMS reflecting mirror situated at a peak and a valley of a sine wave varies with time, and the rotating movements of a traditional polygon mirror are at a constant angular speed, if a traditional fθ lens is installed on a laser scanning unit (LSU) of the MEMS reflecting mirror, the angle of the MEMS reflecting mirror produced by the sinusoidal relation varied with time cannot be corrected, so that the speed of laser beam projected on an image side will not be a non-uniform speed scanning, and the image on the image side will be deviated. Therefore, the laser scanning unit or MEMS laser scanning unit (MEMS LSU) composed of MEMS reflecting mirrors has a characteristic that after the laser bean is scanned by the MEMS reflecting mirror, scan lights at different angles are formed in the same time. Thus, finding a way of developing a fθ lens (some prior art names as f-sin θ lens) for the MEMS laser scanning unit to correct the scan lights, such that a correct image will be projected onto the target, example as, U.S. Pat. No. 7,184,187 provided a polynomial surface for fθ lens to amend the angular velocity variation in the main-scanning direction only. However, the laser light beam is essential an oval-like shape of the cross-section that corrects the scan lights in the main-scanning direction only may not be achieve the accuracy requirements. Obviously, finding a way of developing a fθ lens for the MEMS laser scanning unit to correct the scan lights, such that a correct image will be projected onto the target, demands immediate attentions and feasible solutions.

SUMMARY OR THE INVENTION

The primary objective of the present invention is to overcome the shortcomings of the prior art by providing a single fθ lens used for a micro-electro mechanical system (MEMS) laser scanning unit, which is comprised of a single lens in a meniscus shape having a concave surface on a side of a MEMS reflecting mirror, for projecting a scan light reflected by the MEMS reflecting mirror onto the correct image of a target to achieve a scanning linearity effect required by the laser scanning unit.

Another objective of the present invention is to provide a single fθ lens used for a micro-electro mechanical system (MEMS) laser scanning unit for reducing the area of a spot projected onto the target to achieve the effect of improving the resolution.

A further objective of the present invention is to provide a single fθ lens used for a MEMS laser scanning unit, and the single fθ lens can make a distortion correction to correct optical axis caused by the deviation of the scan light resulting in the problems of an increased deviation of the main scanning direction and the sub scanning direction, and a change of a spot of a drum at the image into an oval-like shape, and the single fθ lens can uniformize the size of each image spot to achieve the effect of enhancing the image quality. Therefore, the single fθ lens used for micro-electro mechanical system (MEMS) laser scanning unit of the invention is applicable for a light source comprising an emitting laser beam, wherein a resonant oscillation is used for reflecting the laser beam of the light source onto MEMS reflecting mirror of the scan light to form an image on the target. As to a laser printer, the target is generally a drum. The spot of the image forms a scan light after the laser beam is emitted from the light source, scanned oscillatory by the MEMS reflecting mirror, and reflected by the MEMS reflecting mirror. After the angle and position of the scan light are corrected by the single fθ lens of the invention, a spot is formed on the drum. Since a photosensitive agent is coated onto the drum, data can be printed out on a piece of paper by the sensing carbon powder centralized on the paper.

The single fθ lens of the invention comprises a first optical surface and a second optical surface, for correcting the phenomenon of non-uniform speed scanning which results in decreasing or increasing the distance between spots on an image surface of a MEMS reflecting mirror with a simple harmonic movement with time into a constant speed scanning, so that the projection of a laser beam onto an image side can give a constant speed scanning, and uniformize the deviation of image formed on the drum and caused by a scan light in the main scanning direction and the sub scanning direction deviated from the optical axis, so as to make a correction to focus the scan light at a target.

To make it easier for our examiner to understand the technical characteristics and effects of the present invention, we use preferred embodiments and related drawings for the detailed description of the present invention as follows:

DETAILED DESCRIPTION OF THE PREFERRED EMBODIMENTS

Figure 1:
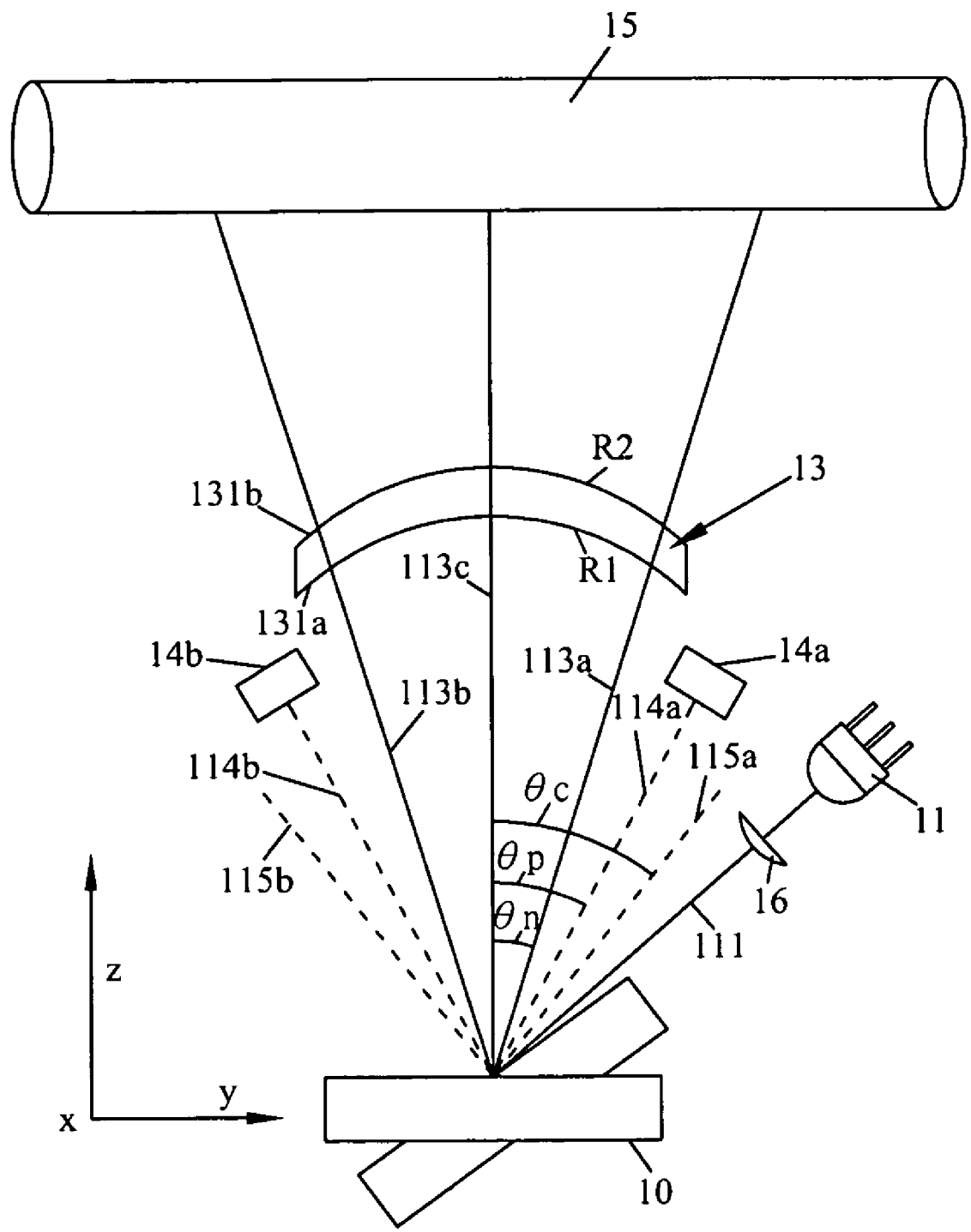
FIG. 1 shows optical paths of a single fθ lens in accordance with the present invention.
Figure 2:
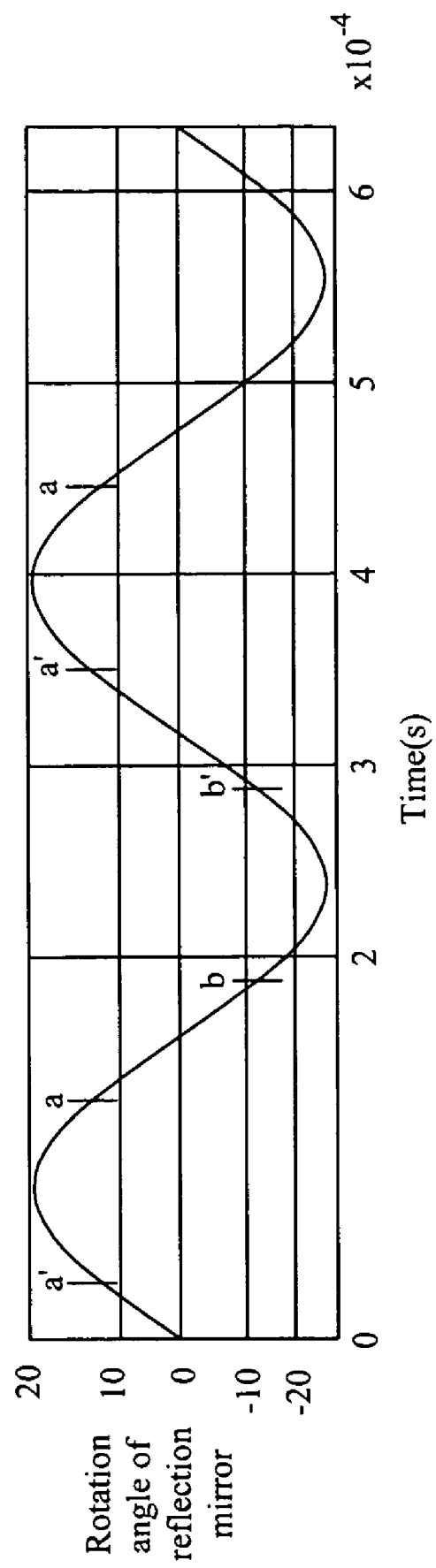
FIG. 2 shows a relation of scanning angle θ versus time t of a MEMS reflecting mirror.

Referring to FIG. 1 for a schematic view of optical paths of a single fθ lens used for micro-electro mechanical system (MEMS) laser scanning unit in accordance with the present invention, the single fθ lens used for a micro-electro mechanical system (MEMS) laser scanning unit 13 comprises a first optical surface and a second optical surface. In FIG. 1, the MEMS laser scanning unit comprises a laser source 11, a MEMS reflecting mirror 10, a cylindrical lens 16, two photoelectric sensors 14a, 14b, and a light sensing target. In FIG. 1, the target is achieved by a drum 15. After a beam 111 produced by the light laser source 11 is passed through a cylindrical lens 16, the beam 111 is projected onto the MEMS reflecting mirror 10. The MEMS reflecting mirror 10 generates a resonant oscillation to reflect the beam 111 into scan lights 113a, 113b, 114a, 114b, 115a, 115b at different time frames along the direction of Z, wherein the scan lights 113a, 113b, 114a, 114b, 115a, 115b are projected in a X direction which is called a sub scanning direction, and projected in a Y direction which is called a main scanning direction, and the maximum scanning angle of the MEMS reflecting mirror 10 is θc. Since the MEMS reflecting mirror 10 comes with a simple harmonic movement, and the angle of movement shows a sinusoidal change with time as shown in FIG. 2, therefore the angle and time of reflecting the scan light are in a non-linear relation. The swinging angle of the MEMS reflecting mirror 10 has a wave peak a-a' and a wave valley b-b' as shown in the figure, and its swinging angle is significantly smaller than the wave sections a-b and a'-b', and this non-uniform angular speed may cause an image deviation produced on the drum 15 by the scan light easily. Therefore, a photoelectric sensor 14a, 14b are installed at the angle ±θp within range below the maximum scanning angle ±θc of the MEMS reflecting mirror 10, and the laser beam 111 starts to be reflected by the MEMS reflecting mirror 10 at the wave peak as shown in FIG. 2, which is equivalent to the scan light 115a as shown in FIG. 1. If the photoelectric sensor 14a detects a scanned beam, it means that the MEMS reflecting mirror 10 swings to an angle of +θp, which is equivalent to the scan light 114a as shown in FIG. 1. If the MEMS reflecting mirror 10 scans point "a" at an angle variation as shown in FIG. 2, such point is equivalent to the position of the scan light 113a. Now, the laser source 11 is controlled to start emitting the laser beam 111. When the point "b" as shown in FIG. 2 is scanned, such point is equivalent to the position of the scan light 113b (which is equivalent to the laser beam 11 emitted by the laser source 11a within an angle of ±θn). When the MEMS reflecting mirror 10 swings in an opposite direction to a wave section a'-b', the laser source 11 is controlled to start emitting the laser beam 111 to complete a cycle.

Figure 3:
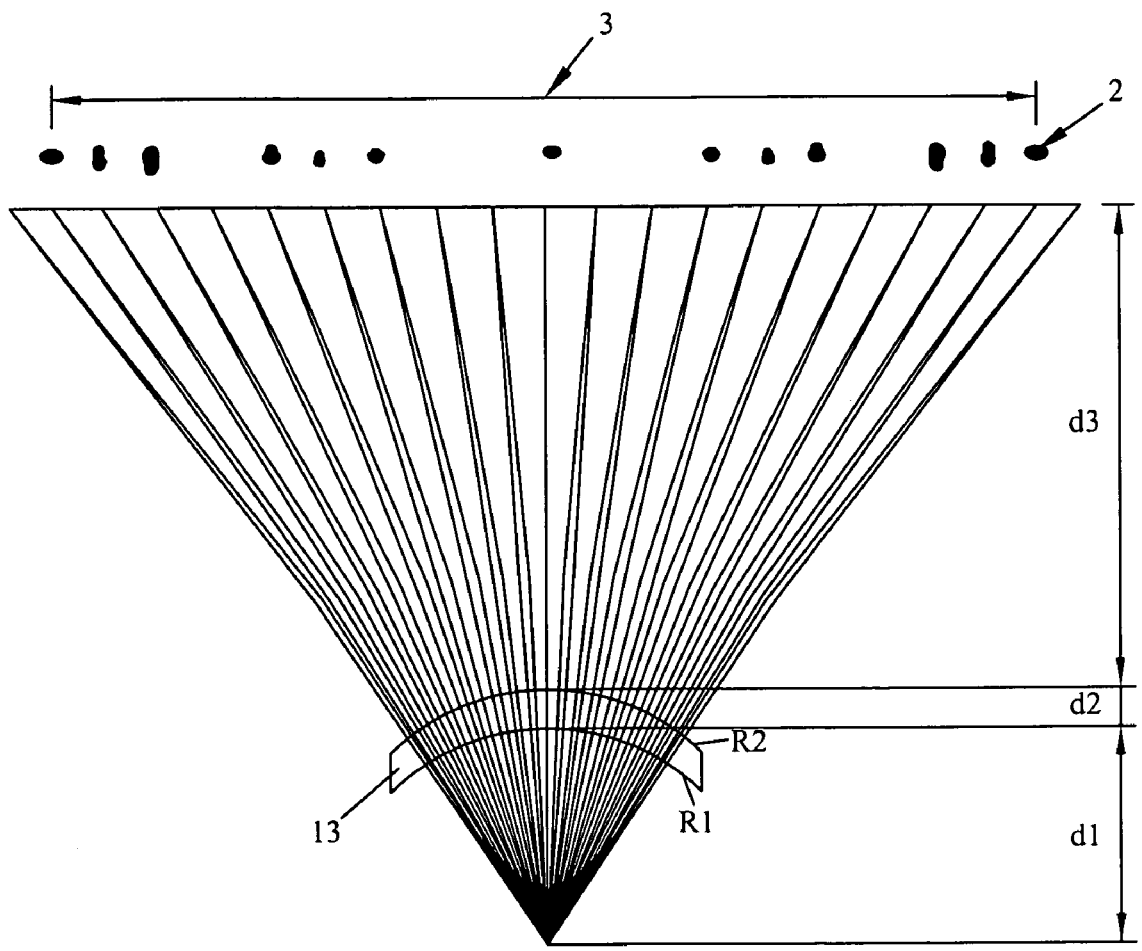
FIG. 3 shows an optical path chart and numerals of a scan light passing through a first lens and a second lens.

Referring to FIG. 3 for an optical path chart of a scan light passing through a fθ lens, ±θn is a valid scanning angle as shown in FIG. 1. If the MEMS reflecting mirror 10 is swinged to an angle of ±θn, the laser source 11 starts emitting the desired scanning laser beam 111 which is reflected into a scan light by the MEMS reflecting mirror 10, and the scan light is passed through the fθ lens 13 and refracted by the first optical surface and the second optical surface of the fθ lens 13, and the scan light reflected by the MEMS reflecting mirror 10 with a non-linear relation of distance and time is converted into a scan light with a linear relation of distance and time. After the scan light is passed through the fθ lens 13, the focusing effect of the first optical surface 131a and the second optical surface 131b can focus the scan light at the drum 15 and form a column of spots 2 on the drum 15, and the distance between the farthest two spots 2 projected on the drum 15 is called a valid scan window 3, wherein, along the optical axis Z, d1 is the distance from the MEMS reflecting mirror 10 to the first optical surface, $d_2$ is the distance from the first optical surface to the second optical surface, $d_3$ is the distance from the second optical surface to the drum 15, $R_1$ is the radius of curvature of the first optical surface, and $R_2$ is the radius of curvature of the second optical surface on the optical axis Z.

Figure 4:
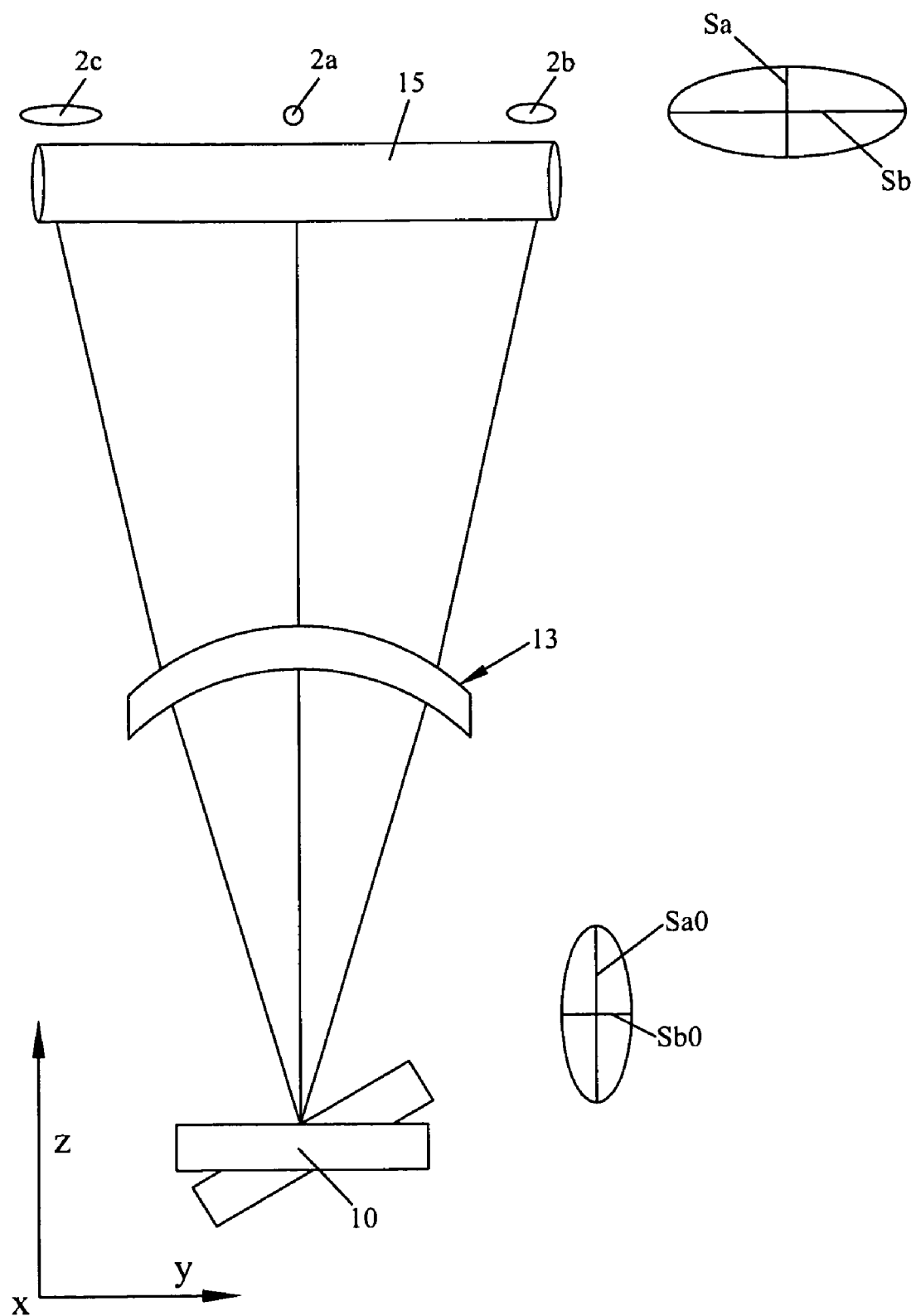
FIG. 4 shows a spot area varied with a different projecting position after a scan light is projected onto a drum.

Referring to FIG. 4 for a spot area varied with a different projecting position after a scan light is projected onto a drum, if the scan light 113a is projected in a direction along the optical axis Z and onto the drum 15 by the fθ lens 13, the incident angle of the fθ lens 13 is zero, and thus the deviation of the main scanning direction is minimum (said zero), and the image of the spot 2a on the drum 15 is in an inferenced circle-like shape (same shape as laser light beam). If the scan light 113b and 113c is projected on the drum 15 by the fθ lens 13, the incident angle of the fθ lens 13 with respect to the optical axis is non-zero, and the deviation of the main scanning direction is non-zero, and thus the projection distance of the main scanning direction is longer than the spot formed by the scan light 111a, the spot formed by a scan light deviated from the scan light 111a is also bigger. Not only the phenomenon exists in the main scanning direction but also presents in the sub scanning direction. Therefore, the image at the spot 2b, 2c on the drum 15 is in an oval-like shape, and the area of 2b, 2c is greater than the area of 2a Denoted $S_{a0}$ and $S_{b0}$ are the lengths of spots of the scan lights in the main scanning direction (Y direction) and the sub scanning direction (X direction) on a reflecting surface of the MEMS reflecting mirror 10, and $S_a$ and $S_b$ are the lengths of any one spot formed by the scan light in the Y direction and the X direction on the drum 15. The single fθ lens of the invention can control the spot size in the main scanning direction within a limited range by the distortion correction of the fθ lens 13 and correct the spot size in the sub scanning direction by the distortion correction of the fθ lens 13, such that the spot size is controlled within a limited range, and the distribution of the spot size (or the ratio of largest spots and smallest spots) is controlled within an appropriate range in compliance with the required resolution.

To achieve the foregoing effects, the single fθ lens of the invention comes with a first optical surface or a second optical surface with a design of spherical surface or aspherical surface. If the aspherical surface is adopted, the aspherical surface is designed with the following equations (2) or (3):

1. Anamorphic Equation:

$$Z = \frac{(Cx)X^2 + (Cy)Y^2}{1 + \sqrt{1 - (1 + Kx)(Cx)^2 X^2 - (1 + Ky)(Cy)^2 Y^2}} + \quad (2)$$

$$A_R[(1-A_P)X^2 + (1+A_P)Y^2]^2 + B_R[(1-B_P)X^2 + (1+B_P)Y^2]^3 +$$

$$C_R[(1-C_P)X^2 + (1+C_P)Y^2]^4 + D_R[(1-D_P)X^2 + (1+D_P)Y^2]^5$$

where, Z is the sag of any point on the surface parallel to the Z-axis, $C_x$ and $C_y$ are curvatures in the X direction and the Y direction respectively, $K_x$ and $K_y$ are the conic coefficients in the X direction and the Y direction respectively and correspond to eccentricity in the same way as conic coefficient for the aspherical surface type, $A_R$, $B_R$, $C_R$ and $D_R$ are deformations from the conic coefficient of rotationally symmetric portions of the fourth order, the sixth order, the eighth order and the tenth order respectively, and $A_P$, $B_P$, $C_P$ and $D_P$ are deformation from the conic coefficient of non-rotationally symmetric components to the fourth order, the sixth order, the eighth order and the tenth order respectively. This reduces to aspherical surface type when $C_x=C_y$, $K_x=K_y$, and $A_P=B_P=C_P=D_P=0$.

2. Toric Equation:

$$Z = Zy + \frac{(Cxy)X^2}{1 + \sqrt{1 - (Cxy)^2 X^2}} \quad (3)$$

$$Cxy = \frac{1}{(1/Cx) - Zy}$$

$$Zy = \frac{(Cy)Y^2}{1 + \sqrt{1 - (1 + Ky)(Cy)^2 Y^2}} + B_4 Y^4 + B_6 Y^6 + B_8 Y^8 + B_{10} Y^{10}$$

Where, Z is the sag of any point on the surface parallel to the z-axis; $C_x$ and $C_y$ are curvatures in the X direction and the Y direction respectively, $K_y$ is a conic coefficient in the Y direction, $B_4$, $B_6$, $B_8$ and $B_{10}$ are deformations from the conic coefficient to the fourth, sixth, eighth and tenth orders respectively. When $C_x=C_y$ and $K_y=B_4=B_6=B_8=B_{10}=0$ is reduced to a single spherical surface.

To uniformize the scan speed of the scan light projected onto the image of the target, the invention adopts two equal time intervals and an equal distance between two spots, and the single fθ lens of the invention can correct the emergence angle of the scan light between the scan light 113a to the scan light 113b, so that two scan lights are at the same time interval. After the emergence angle is corrected, the distance between any two spots formed on the drum 15 of the image is equal. Further, after the laser beam 11 is reflected by the MEMS reflecting mirror 10, the spot is diverged and becomes larger. After the scan light is passed through the distance from the MEMS reflecting mirror 10 to the drum 15, the spot becomes even larger. Such arrangement is in compliance with the actual required resolution. The single fθ lens of the invention further focuses from the scan light 113a to the scan light 113b reflected by the MEMS reflecting mirror 10 at the drum 15 of the image to form a smaller spot in the main scanning and sub scanning directions. The single fθ lens of the invention further uniformizes the spot size of the image on the drum 15 (to limit the spot size in a range to comply with the required resolution) for the best resolution.

The single fθ lens of the invention is a lens in a meniscus shape and having a concave surface on a side of the MEMS reflecting mirror, and the lens includes a first optical surface and a second optical surface for converting a scan spot with a non-linear relation of angle with time and reflected by the MEMS reflecting mirror 10 into a scan spot with a linear relation of distance with time, and correct the scan light to be focused on the target, and the single fθ lens 13 projects a scan light reflected by the MEMS reflecting mirror 10 onto the image of the drum 15. The first optical surface and the second optical surface are optical surfaces composed of at least one aspherical surface in the main scanning direction. The first optical surface and the second optical surface are optical surfaces composed of at least one aspherical surface in the sub scanning direction. Further, the assembly of the single fθ lens 13 has an optical effect in the main scanning direction that satisfies the conditions of Equation (4):

$$0 < \frac{d_3}{f_Y} < 0.6 \quad (4)$$

or, the main scanning direction satisfies the conditions of Equation (5):

$$0.05 < \left|\frac{f_s}{f_Y}(n_d - 1)\right| < 0.5 \quad (5)$$

and the sub scanning direction satisfies the conditions of Equation (6):

$$0.1 < \left|\left(\frac{1}{R_{1x}} \frac{1}{R_{2x}}\right)f_s\right| < 10.0 \quad (6)$$

where, $f_Y$ is the focal length of the ID lens 13 in the main scanning direction, $d_3$ is the distance between an optical surface on a target side of the fθ lens 13 when θ=0° to the target, fs is the focal length of the single fθ lens 13, $R_{ix}$ is radius of curvature of the i-th optical surface in the X direction; and nd is the refraction index of the fθ lens 13.

Further, the spot uniformity produced by the single fθ lens of the invention can be indicated by the ratio δ of the largest spot and the smallest spot size that satisfies the conditions of Equation (7):

$$0.2 < \delta = \frac{\min(S_b \cdot S_a)}{\max(S_b \cdot S_a)} \quad (7)$$

The resolution produced by the single fθ lens of the invention can be indicated by the ratio $\eta_{max}$ of the largest spot on the drum 15 formed by the scan light on the reflecting surface of the MEMS reflecting mirror 10 (or the ratio of scanning light of maximum spot) and the ratio $\eta_{min}$ of the smallest spot formed by the scan light on the reflecting surface of the MEMS reflecting mirror 10 (or the ratio of scanning light of minimum spot), and the ratios satisfy the conditions of Equations (9) and (10)

$$\eta_{max} = \frac{\max(S_b \cdot S_a)}{(S_{b0} \cdot S_{a0})} < 0.25 \quad (9)$$

$$\eta_{min} = \frac{\min(S_b \cdot S_a)}{(S_{b0} \cdot S_{a0})} < 0.1 \quad (10)$$

where, $S_a$ and $S_b$ are the lengths of any one spot of the scan light formed on the drum in the main scanning direction and the sub scanning direction, δ is the ratio of the smallest spot and the largest spot on the drum 15, $S_{a0}$ and $S_{b0}$ are the lengths of the spots of the scan light on the reflecting surface of the MEMS reflecting mirror 10 in the main scanning direction and the sub scanning direction.

To make it easier for our examiner to understand the structure and technical characteristics of the present invention, we use the preferred embodiments accompanied with related drawings for the detailed description of the present invention as follows.

The following preferred embodiments of the invention disclose a single fθ lens used for micro-electro mechanical system (MEMS) laser scanning unit by using major elements for the illustration, and thus the preferred embodiments can be applied in a MEMS laser scanning unit including but not limited to the single fθ lens with components illustrated in the embodiments only, but any other equivalents are intended to be covered in the scope of the present invention. In other words, any variation and modification of the single fθ lens used for a micro-electro mechanical system (MEMS) laser scanning unit can be made by the persons skilled in the art. For example, the radius of curvature, the design of the shape, the selected material and the distance can be adjusted without any particular limitation.

In first best embodiment, the single fθ lens 13 is a lens in a meniscus shape and having a concave surface on the side of the MEMS reflecting mirror, and the first optical surface is a aspherical surface designed with the Equation (3), and the second optical surface is a aspherical surface designed with the Equation (2), and the optical characteristics and the aspherical surface parameters are listed in Tables 1 and 2.

TABLE 1

Optical Characteristics of fθ lens for First Preferred Embodiment
fs = 206.0

| optical surface | R, curvature (mm) | d, thickness (mm) | nd, refraction index |
|---|---|---|---|
| MEMS reflection R0 | ∞ | 35.00 | 11.533 |
| R1 (Y Toroid) | | | |
| R1x | −23.7366 | 8.00 | |
| R1y* | −53.7455 | | |
| R2 (Anamorphic) | | | |
| R2x* | −11.4837 | 202.54 | |
| R2y* | −45.7037 | | |
| drum R3 | ∞ | | |

*aspherical surface

TABLE 2

Parameters of Aspherical Surface of Optical Surface Parameter for First Preferred Embodiment

| | Toric equation Coefficient | | | | |
|---|---|---|---|---|---|
| optical surface | Ky (Conic Coefficent) | 4th Order Coefficient (B4) | 6th Order Coefficient (B6) | 8th Order Coefficient (B8) | 10th Order Coefficient (B10) |
| R1* | −2.210E+00 | −1.730E−06 | −4.047E−10 | −8.574E−14 | 0.000E+00 |
| | Anamorphic equation coefficent | | | | |
| | Ky (Conic Coefficent) | 4th Order Coefficient (AR) | 6th Order Coefficient (BR) | 8th Order Coefficient (CR) | 10th Order Coefficient (DR) |
| R2* | 9.880E−07 | 9.880E−07 | −2.494E−11 | 0.000E+00 | 0.000E+00 |
| | Kx (Conic Coefficent) | 4th Order Coefficient (AP) | 6th Order Coefficient (BP) | 8th Order Coefficient (CP) | 10th Order Coefficient (DP) |
| | −6.095E−01 | −4.660E−01 | 6.554E−01 | 0.000E+00 | 0.000E+00 |

Figure 5:
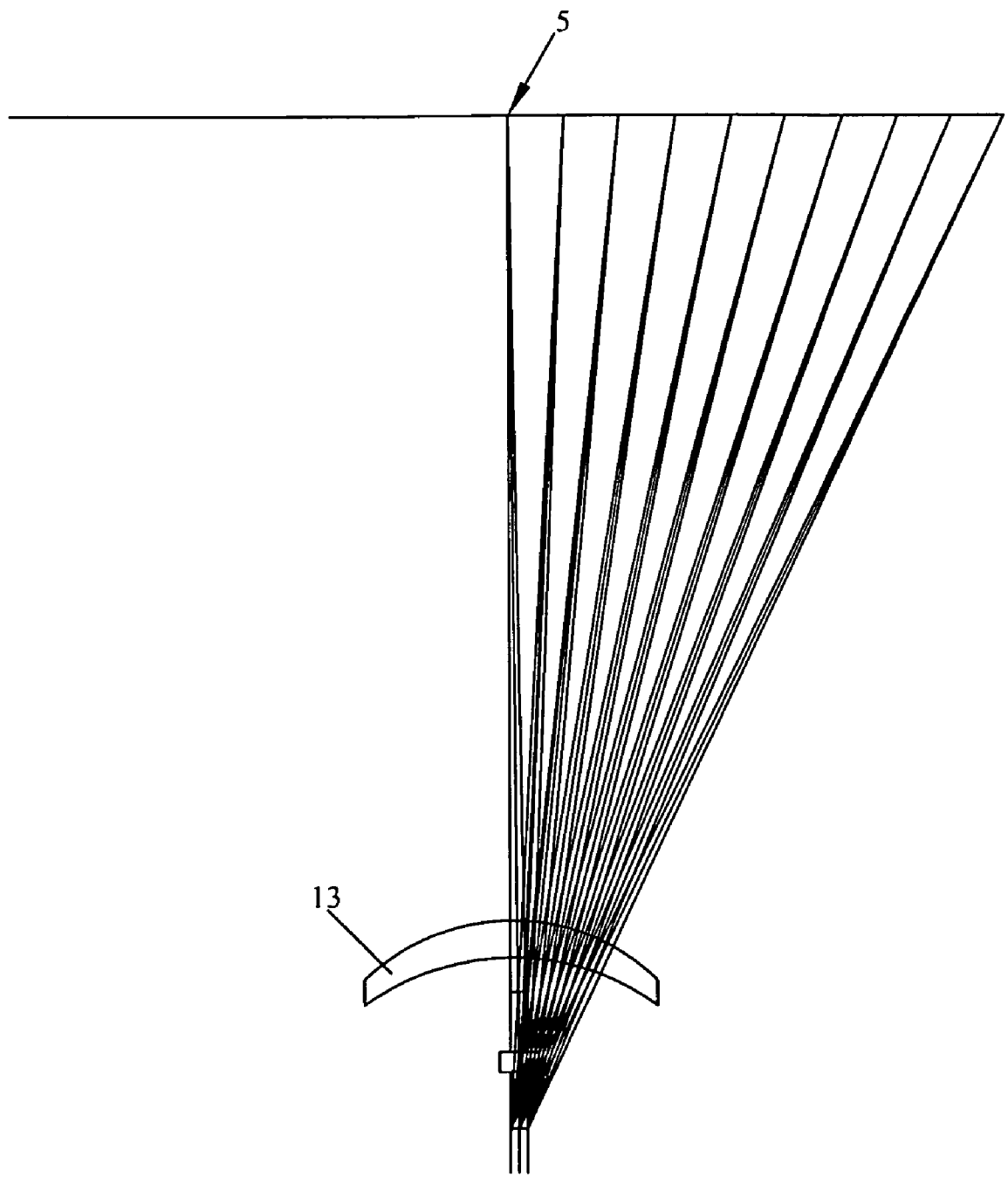
FIG. 5 shows an optical path in accordance with a first preferred embodiment of the present invention.
Figure 6:
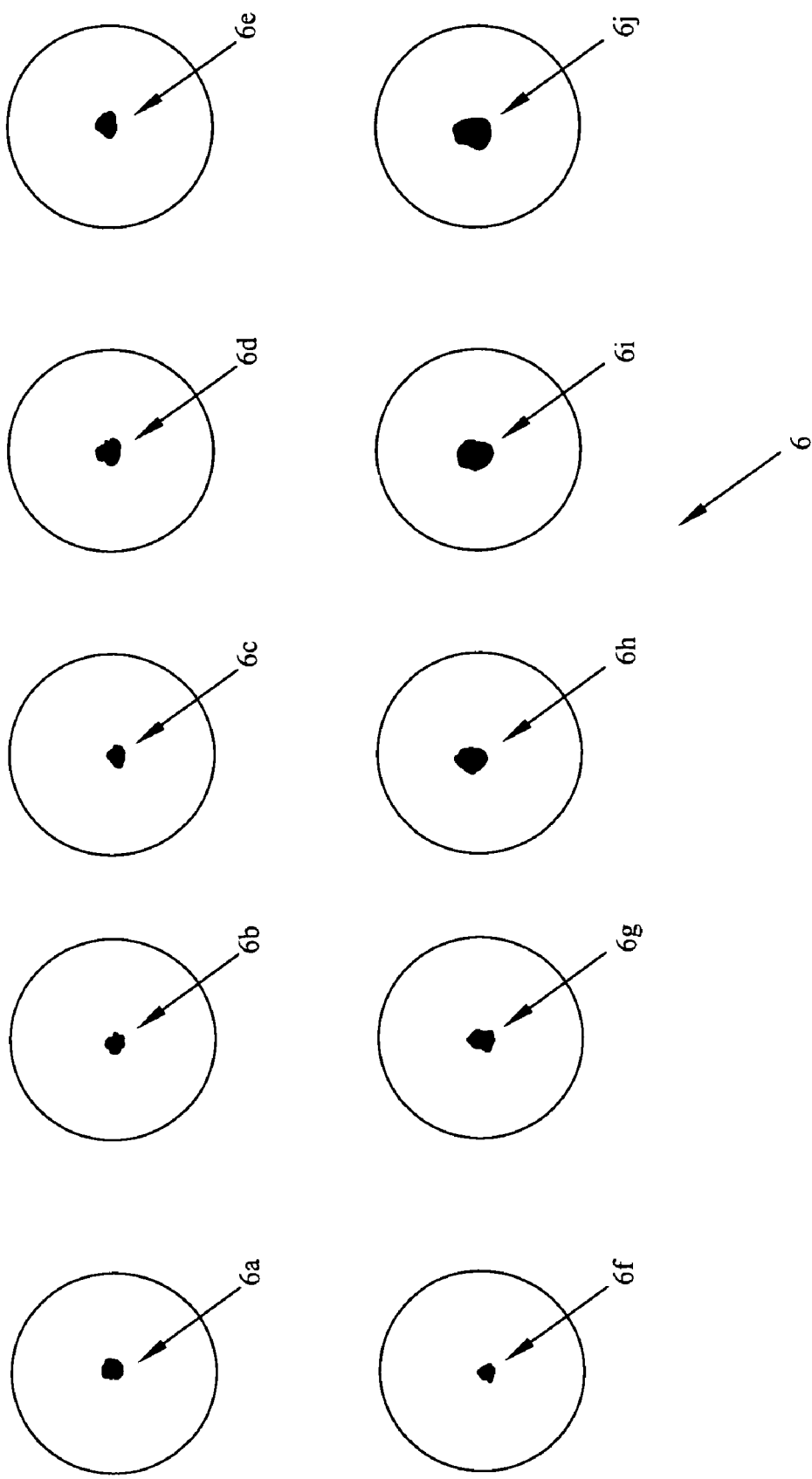
FIG. 6 shows spots in accordance with a first preferred embodiment of the present invention.

Referring to FIG. 5 for the optical path chart of an optical surface of the single fθ lens 13, $f_X$=34.432 and $f_Y$=431.228 (mm), so that the scan light can be converted into a scan spot with a linear relation of distance and time, and the spots with $S_{a0}$=13.616 and $S_{b0}$=3747.202 (μm) on the MEMS reflecting mirror 10 are scanned into scan lights and focused on the drum 15 to form a smaller spot and satisfy the conditions of Equations (4) to (10) as listed in Table 3. The distribution of spot sizes from the central axis 5 to the right side of the scan window 3 is as follows: a spot 6a (on the central axis) and spots 6b~6j (on the utmost right side of the scan window 3) as shown in FIG. 6, and the left and right sides of the scan window 3 are symmetrical.

TABLE 3

Conditions for First Preferred Embodiment

| | |
|---|---|
| $\dfrac{d_3}{f_Y}$ | 0.470 |
| Main scanning direction $\left\lvert \dfrac{f_s}{f_Y}(n_d - 1) \right\rvert$ | 0.255 |
| sub scanning direction $\left\lvert \left(\dfrac{1}{R_{1x}} - \dfrac{1}{R_{2x}}\right) f_s \right\rvert$ | 9.260 |
| $\delta = \dfrac{\min(S_b \cdot S_a)}{\max(S_b \cdot S_a)}$ | 0.8150 |
| $\eta_{max} = \dfrac{\max(S_b \cdot S_a)}{(S_{b0} \cdot S_{a0})}$ | 0.0873 |

TABLE 3-continued

Conditions for First Preferred Embodiment

| | |
|---|---|
| $\eta_{min} = \dfrac{\min(S_b \cdot S_a)}{(S_{b0} \cdot S_{a0})}$ | 0.0605 |

In the second best preferred embodiment, the single fθ lens 13 is a lens in a meniscus shape and having a concave surface disposed on the side of the MEMS reflecting mirror, and the first optical surface is aspherical surface designed with the Equation (3), and the second optical surface is an aspherical surface designed with the Equation (2). The optical characteristics and the aspherical surface parameters of this single fθ lens 13 are listed in Tables 4 and 5.

TABLE 4

Optical characteristics of fθ lens for Second Preferred Embodiment
fs = 206.0

| optical surface | R, curvature (mm) | d, thickness (mm) | nd, refraction index |
|---|---|---|---|
| MEMS reflection R0 | ∞ | 35.00 | 11.533 |
| R1 (Y Toroid) | | | |
| R1x | −23.7279 | 8.00 | |
| R1y* | −54.7461 | | |
| R2 (Anamorphic) | | | |
| R2x* | −11.4774 | 171.82 | |
| R2y* | −45.9692 | | |
| drum R3 | ∞ | | |

*aspherical surface

TABLE 5

Parameters of Aspherical Surface of Optical Surface Parameter for Second Preferred Embodiment

| | Toric equation Coefficient | | | | |
|---|---|---|---|---|---|
| optical surface | Ky (Conic Coefficent) | 4th Order Coefficient (B4) | 6th Order Coefficient (B6) | 8th Order Coefficient (B8) | 10th Order Coefficient (B10) |
| R1* | −2.4082E+00 | −1.6080E−06 | −2.7948E−10 | −6.4852E−14 | 0.0000E+00 |

TABLE 5-continued

Parameters of Aspherical Surface of Optical Surface Parameter for Second Preferred Embodiment

| | Anamorphic equation coefficent | | | | |
|---|---|---|---|---|---|
| | Ky (Conic Coefficent) | 4th Order Coefficient (AR) | 6th Order Coefficient (BR) | 8th Order Coefficient (CR) | 10th Order Coefficient (DR) |
| R2* | 4.5303E−03 | 5.6662E−07 | −6.4896E−11 | 0.0000E+00 | 0.0000E+00 |
| | Kx (Conic Coefficent) | 4th Order Coefficient (AP) | 6th Order Coefficient (BP) | 8th Order Coefficient (CP) | 10th Order Coefficient (DP) |
| | −6.1731E−01 | −2.6372E−01 | 1.1048E−01 | 0.0000E+00 | 0.0000E+00 |

Figure 7:
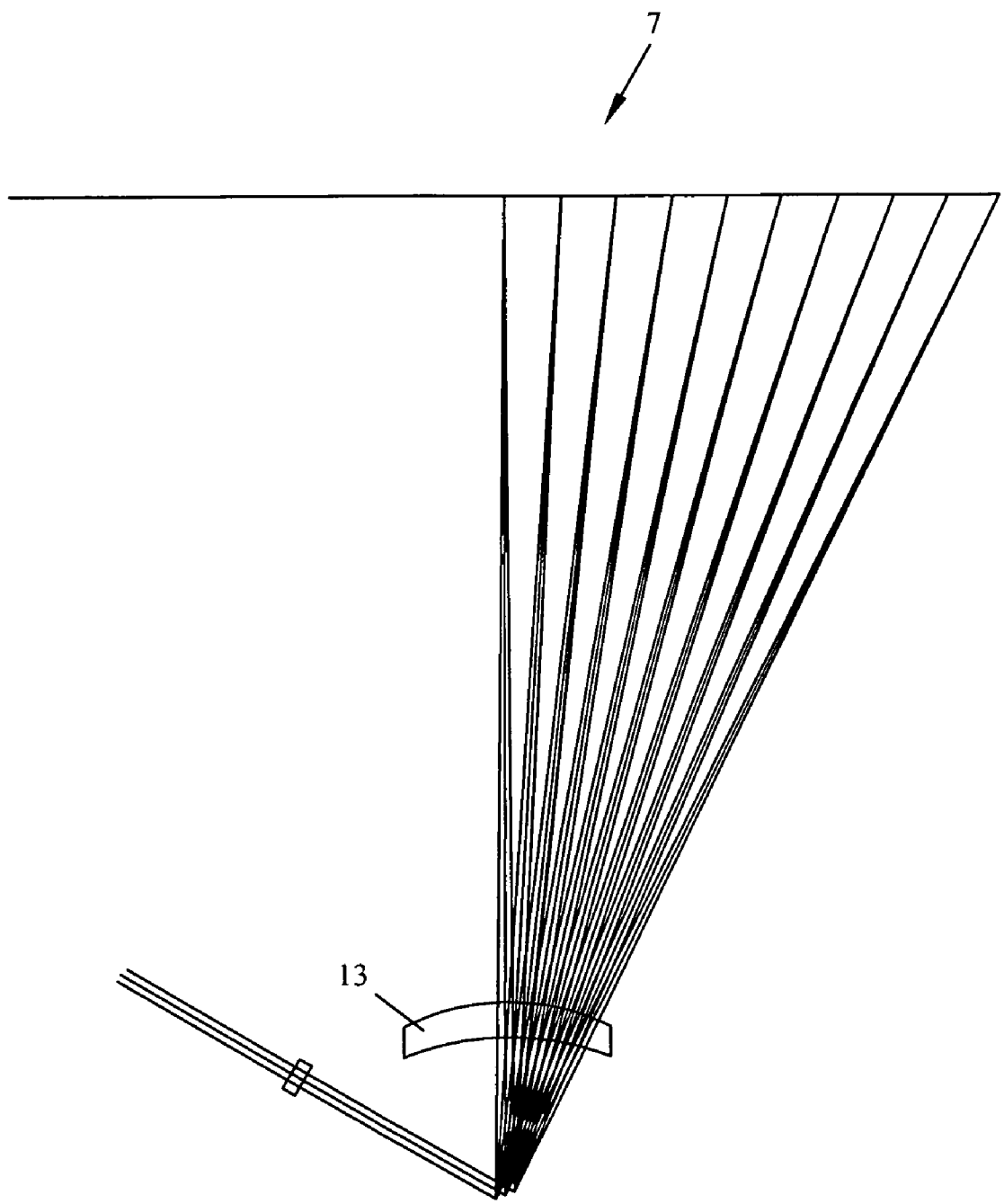
FIG. 7 shows optical paths in accordance with a second preferred embodiment of the present invention.
Figure 8:
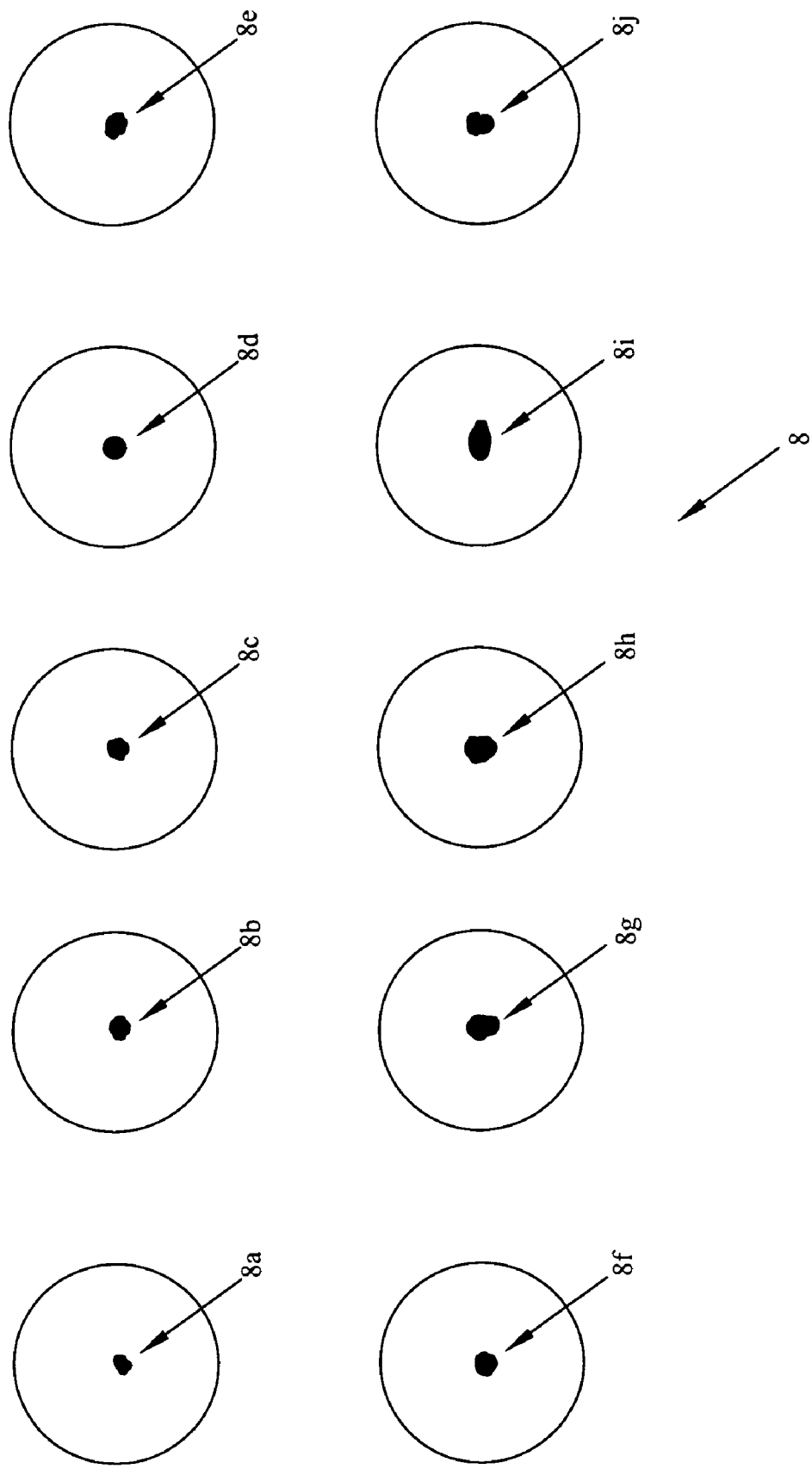
FIG. 8 shows spots in accordance with a second preferred embodiment of the present invention.

Referring to FIG. 7 for the optical path chart of an optical surface of the single fθ lens 13, $f_x$=34.406 and $f_y$=413.661 (mm), so that the scan light can be converted into a scan spot with a linear relation of distance and time, and the spots with $S_{a0}$=13.64 and $S_{b0}$=3720.126 (μm) on the MEMS reflecting mirror 10 are scanned into scan lights and focused on the drum 15 to form a smaller spot and satisfy the conditions of Equations (4) to (10) as listed in Table 6. The distribution of spot sizes from the central axis 7 to the right side of the scan window 3 is as follows: a spot 8a (on the central axis) and spots 8b~8j (on the utmost right side of the scan window 3) as shown in FIG. 8, and the left and right sides of the scan window 3 are symmetrical.

TABLE 6

| Conditions for Second Preferred Embodiment | |
|---|---|
| $\dfrac{d_3}{f_Y}$ | 0.415 |
| main scanning direction $\left\lvert \dfrac{f_s}{f_Y}(n_d - 1) \right\rvert$ | 0.265 |
| sub scanning direction $\left\lvert \left(\dfrac{1}{R_{1x}} - \dfrac{1}{R_{2x}}\right)f_s \right\rvert$ | 9.267 |
| $\delta = \dfrac{\min(S_b \cdot S_a)}{\max(S_b \cdot S_a)}$ | 0.6962 |
| $\eta_{max} = \dfrac{\max(S_b \cdot S_a)}{(S_{b0} \cdot S_{a0})}$ | 0.0874 |
| $\eta_{min} = \dfrac{\min(S_b \cdot S_a)}{(S_{b0} \cdot S_{a0})}$ | 0.0609 |

In the third best preferred embodiment, the single fθ lens 13 is a lens in a meniscus shape and having a concave surface disposed on a side of the MEMS reflecting mirror, and the first optical surface is aspherical surface designed with the Equation (3), and the second optical surface is a aspherical surface designed with the Equation (2). The optical characteristics and the aspherical surface parameters of this single fθ lens 13 are listed in Tables 7 and 8.

TABLE 7

Optical Characteristics of fθ Lens for Third Preferred Embodiment
fs = 206.0

| optical surface | R, curvature (mm) | d, thickness (mm) | nd, refraction index |
|---|---|---|---|
| MEMS reflection R0 | ∞ | 35.00 | 11.533 |
| R1 (Y Toroid) | | | |
| R1x | −23.5419 | 8.00 | |
| R1y* | −55.6802 | | |
| R2 (Anamorphic) | | | |
| R2x* | −11.4583 | 171.04 | |
| R2y* | −46.0943 | | |
| drum R3 | ∞ | | |

*aspherical surface

TABLE 8

Optical Characteristics of fθ Lens for Third Preferred Embodiment

| | Toric equation Coefficient | | | | |
|---|---|---|---|---|---|
| optical surface | Ky (Conic Coefficent) | 4th Order Coefficient (B4) | 6th Order Coefficient (B6) | 8th Order Coefficient (B8) | 10th Order Coefficient (B10) |
| R1* | −2.9737E+00 | −1.5380E−06 | 0.0000E+00 | 0.0000E+00 | 0.0000E+00 |
| | Anamorphic equation coefficent | | | | |
| | Ky (Conic Coefficent) | 4th Order Coefficient (AR) | 6th Order Coefficient (BR) | 8th Order Coefficient (CR) | 10th Order Coefficient (DR) |

TABLE 8-continued

Optical Characteristics of fθ Lens for Third Preferred Embodiment

| | | | | |
|---|---|---|---|---|
| R2* | −1.3636E−01 | 2.0490E−07 | 0.0000E+00 | 0.0000E+00 | 0.0000E+00 |

| Kx (Conic Coefficent) | 4th Order Coefficient (AP) | 6th Order Coefficient (BP) | 8th Order Coefficient (CP) | 10th Order Coefficient (DP) |
|---|---|---|---|---|
| −6.0742E−01 | 3.1012E−01 | 0.0000E+00 | 0.0000E+00 | 0.0000E+00 |

Figure 9:
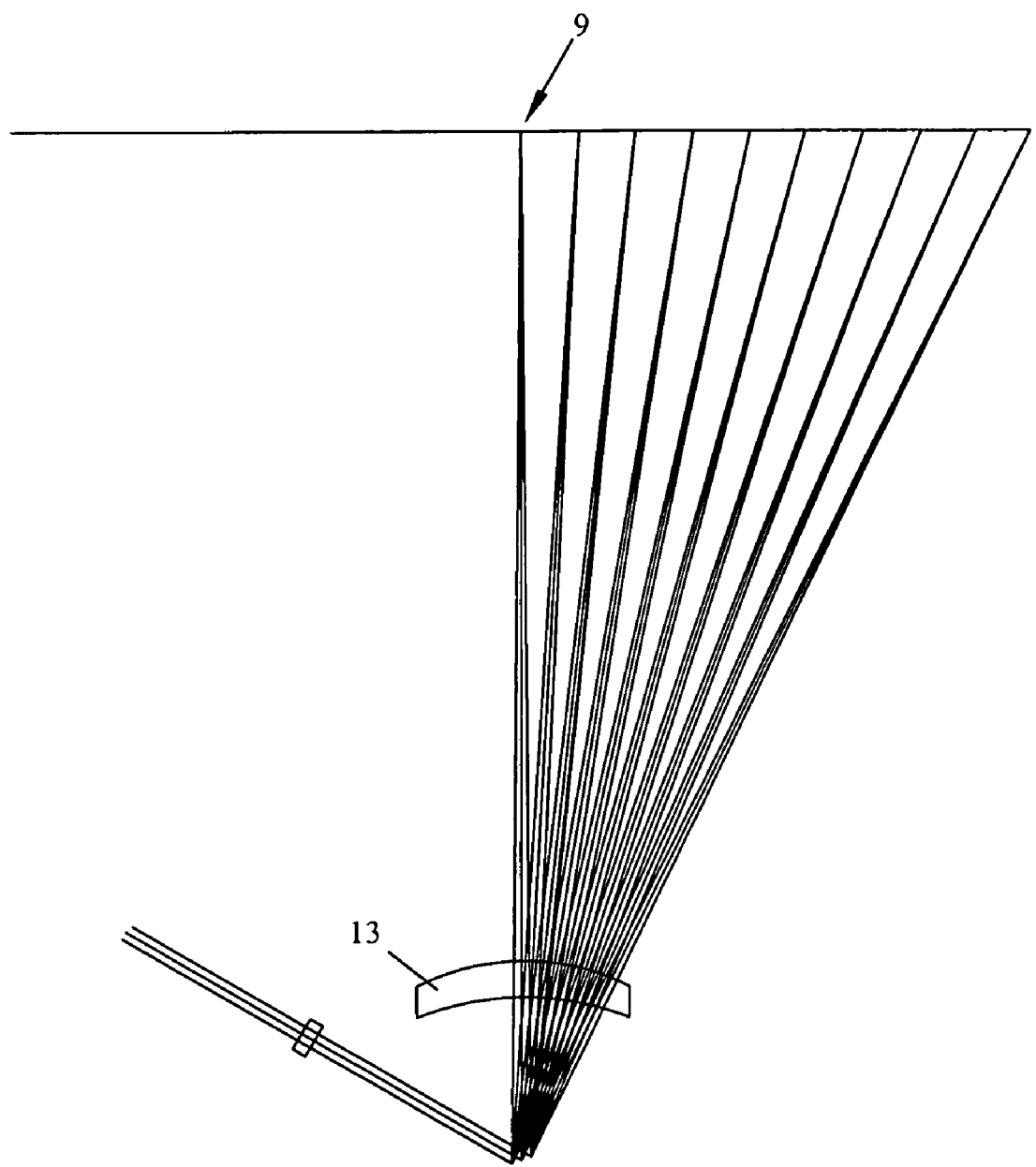
FIG. 9 shows optical paths in accordance with a third preferred embodiment of the present invention.
Figure 10:
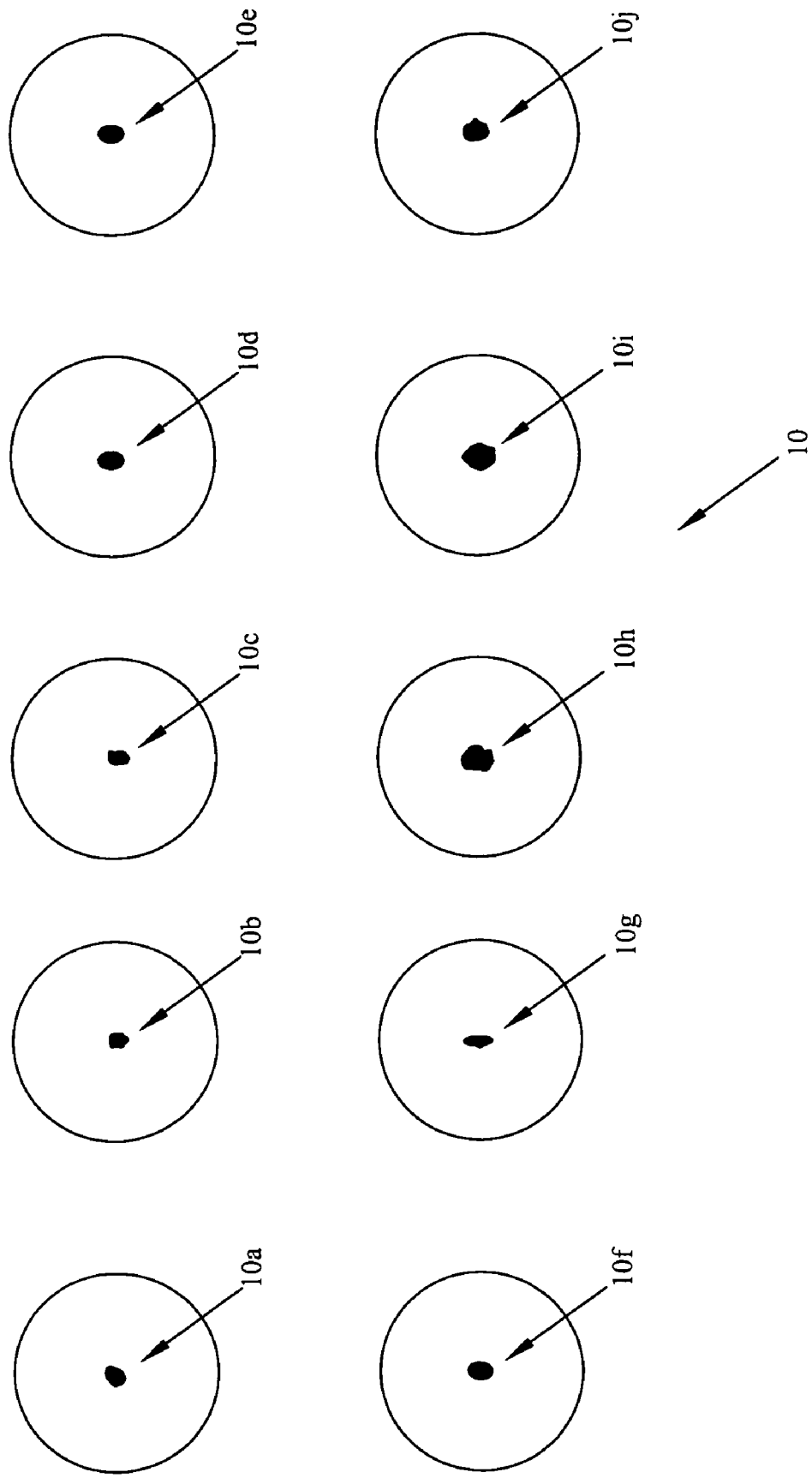
FIG. 10 shows spots in accordance with a third preferred embodiment of the present invention.

Referring to FIG. 9 for the optical path chart of an optical surface of the single fθ lens 13, $f_X$=4831.254 and $f_Y$=−559.613 (mm), so that the scan light can be converted into a scan spot with a linear relation of distance and time, and the spots with $S_{a0}$=14.488 and $S_{b0}$=2800.64 (μm) on the GEMS reflecting mirror 10 are scanned into scan lights and focused on the drum 15 to form a smaller spot and satisfy the conditions of Equations (4) to (10) as listed in Table 9. The distribution of spot sizes from the central axis 9 to the right side of the scan window 3 is as follows: a spot 10a (on the central axis) and spots 10b~10j (on the utmost right side of the scan window 3) as shown in FIG. 10, and the left and right sides of the scan window 3 are symmetrical.

TABLE 9

Conditions for Third Preferred Embodiment

| | |
|---|---|
| $\dfrac{d_3}{f_Y}$ | 0.434 |
| main scanning direction $\left\lvert \dfrac{f_s}{f_Y}(n_d - 1) \right\rvert$ | 0.279 |
| sub scanning direction $\left\lvert \left( \dfrac{1}{R_{1x}} - \dfrac{1}{R_{2x}} \right) f_s \right\rvert$ | 9.228 |
| $\delta = \dfrac{\min(S_b \cdot S_a)}{\max(S_b \cdot S_a)}$ | 0.6982 |
| $\eta_{max} = \dfrac{\max(S_b \cdot S_a)}{(S_{b0} \cdot S_{a0})}$ | 0.0904 |
| $\eta_{min} = \dfrac{\min(S_b \cdot S_a)}{(S_{b0} \cdot S_{a0})}$ | 0.0631 |

In the fourth best embodiment, the single fθ lens 13 is a lens in a meniscus shape and having a concave surface disposed on a side of the MEMS reflecting mirror, and the first optical surface is aspherical surface designed with the Equation (3), and the second optical surface is a aspherical surface designed with the Equation (2). The optical characteristics and the aspherical surface parameters of this single fθ lens 13 are listed in Tables 10 and 11.

TABLE 10

Optical Characteristics of fθ Lens for Fourth Preferred Embodiment
fs = 198.0

| optical surface | R, curvature (mm) | d, thickness (mm) | nd, refraction index |
|---|---|---|---|
| MEMS reflection R0 | ∞ | 35.00 | 11.533 |
| R1 (Y Toroid) | | | |
| R1x | −24.9907 | 8.00 | |
| R1y* | −39.1750 | | |
| R2 (Anamorphic) | | | |
| R2x* | −11.4785 | 153.43 | |
| R2y* | −38.8607 | | |
| drum R3 | ∞ | | |

*aspherical surface

TABLE 11

Parameters of Aspherical Surface of Optical Surface for Fourth Preferred Embodiment

| | Toric equation Coefficient | | | | |
|---|---|---|---|---|---|
| optical surface | Ky (Conic Coefficent) | 4th Order Coefficient (B4) | 6th Order Coefficient (B6) | 8th Order Coefficient (B8) | 10th Order Coefficient (B10) |
| R1* | 1.6363E−01 | 1.6194E−07 | 1.0364E−10 | 0.0000E+00 | 0.0000E+00 |
| | Anamorphic equation coeffecent | | | | |
| | Ky (Conic Coefficent) | 4thOrder Coefficient (AR) | 6th Order Coefficient (BR) | 8th Order Coefficient (CR) | 10th Order Coefficient (DR) |
| R3* | −7.6067E−02 | 3.8956E−07 | 4.7887E−11 | 0.0000E+00 | 0.0000E+00 |
| | Kx (Conic Coefficent) | 4th Order Coefficient (AP) | 6th Order Coefficient (BP) | 8th Order Coefficient (CP) | 10th Order Coefficient (DP) |
| | −6.1840E−01 | −5.8309E−01 | 0.0000E+00 | 0.0000E+00 | 0.0000E+00 |

Figure 11:
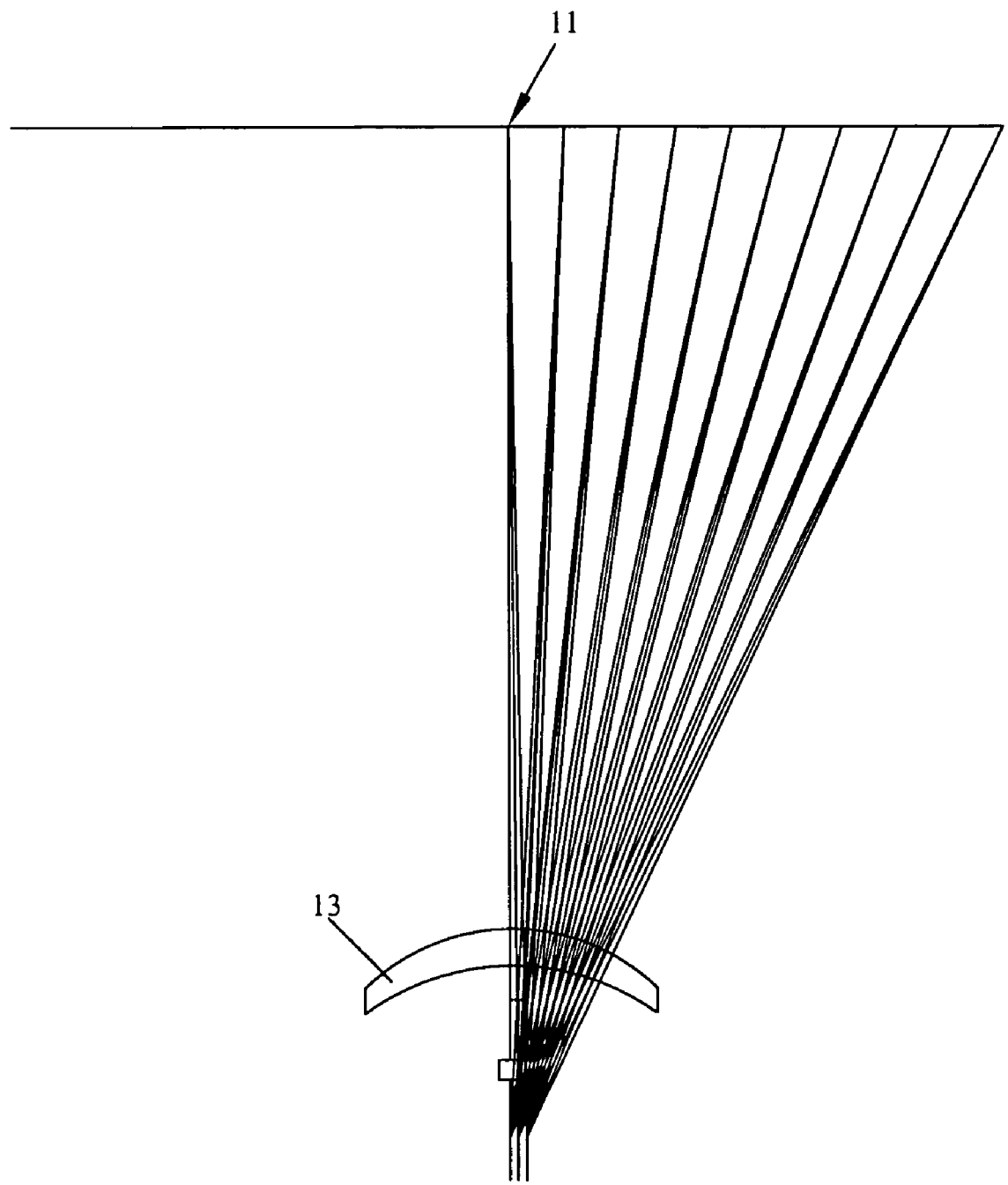
FIG. 11 shows an optical path in accordance with a fourth preferred embodiment of the present invention.
Figure 12:
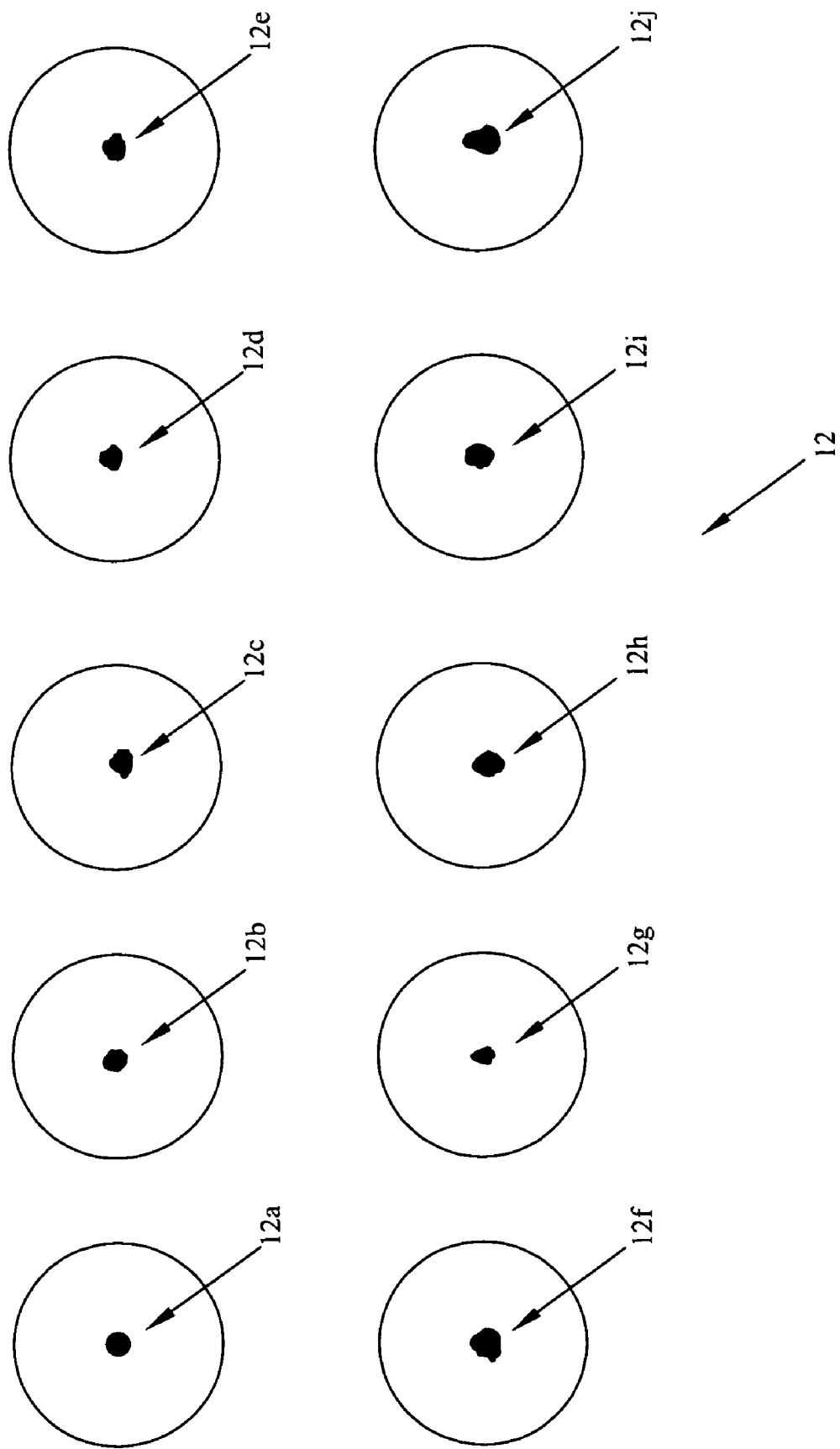
FIG. 12 shows spots in accordance with a fourth preferred embodiment of the present invention.

Referring to FIG. 11 for the optical path chart of an optical surface of the single fθ lens 13, $f_X$=33.431 and $f_Y$=938.65 (mm), so that the scan light can be converted into a scan spot with a linear relation of distance and time, and the spots with $S_{a0}$=11.288 and $S_{b0}$=3517.812 (μm) on the MEMS reflecting mirror 10 are scanned into scan lights and focused on the drum 15 to form a smaller spot and satisfy the conditions of Equations (4) to (10) as listed in Table 12. The distribution of spot sizes from the central axis 11 to the right side of the scan window 3 is as follows: a spot 12a (on the central axis) and spots 12b~12j (on the utmost right side of the scan window 3) as shown in FIG. 12, and the left and right sides of the scan window 3 are symmetrical.

TABLE 12

Conditions for Fourth Preferred Embodiment

| | |
|---|---|
| $\dfrac{d_3}{f_Y}$ | 0.163 |
| main scanning direction $\left\|\dfrac{f_s}{f_Y}(n_d - 1)\right\|$ | 0.112 |
| sub scanning direction $\left\|\left(\dfrac{1}{R_{1x}} - \dfrac{1}{R_{2x}}\right)f_s\right\|$ | 9.327 |
| $\delta = \dfrac{\min(S_b \cdot S_a)}{\max(S_b \cdot S_a)}$ | 0.6150 |
| $\eta_{max} = \dfrac{\max(S_b \cdot S_a)}{(S_{b0} \cdot S_{a0})}$ | 0.0942 |
| $\eta_{min} = \dfrac{\min(S_b \cdot S_a)}{(S_{b0} \cdot S_{a0})}$ | 0.0579 |

In view of the aforementioned preferred embodiments, the present invention at least has the following effects:

(1) With the single fθ lens of the invention, the scanning is corrected the phenomenon of non-uniform speed which results in decreasing or increasing the distance between spots on an image surface of a MEMS reflecting mirror with a simple harmonic movement with time into a constant speed scanning, so that the laser beam at the image side is projected for a uniform speed scanning and an equal distance between any two adjacent spots can be achieved for the image on a target.

(2) With the single fθ lens of the invention, the distortion correction is provided for correcting the main scanning direction and sub scanning direction of the scan light, so as to focus the spot size focused and imaged at the target.

(3) With the single fθ lens of the invention, the distortion correction is provided for correcting the main scanning direction and the sub scanning direction of the scan light, so that the spot size of the image on the target can be uniformized.

What is claimed is:

1. A single fθ lens used for a micro-electro mechanical system (MEMS) laser scanning unit, applied in a MEMS laser scanning unit, which the MEMS laser scanning unit comprising a light source for emitting laser beam, a MEMS reflecting mirror for reflecting laser beam emitted by a light source into a scanning light by resonant oscillation, and a target provided for sensing light;

wherein, the single fθ lens being a lens in a meniscus shape and having a concave surface on the side of the MEMS reflecting minor, comprising a first optical surface and a second optical surface, at least one optical surface is aspherical surface in both main scanning direction and sub scanning direction; said the single fθ lens converting the non-linear relation of reflecting angle with time into a linear relation between the distance of the scan spot with time and focusing the scanning light to form an image at the target;

wherein the main scanning direction satisfies the condition of $$0 < \frac{d_3}{f_Y} < 0.6;$$

wherein, $f_y$ is the focal length of the single fθ lens in the main scanning direction, and $d_3$ is the distance from the second optical surface to the target side on the optical axis Z.

2. The single fθ lens of claim 1, further satisfying the conditions of:

in the main scanning direction $$0.05 < \left|\frac{f_s}{f_Y}(n_d - 1)\right| < 0.5;$$

and in the sub scanning direction $$0.1 < \left|\left(\frac{1}{R_{1x}} \frac{1}{R_{2x}}\right)f_s\right| < 10.0;$$

wherein $f_y$ is the focal length of the single fθ lens in the main scanning direction, and $f_s$ is the focal length of the single fθ lens, $R_{ix}$ is the radius of curvature of the i-th optical surface in the X-axis direction, and $n_d$ is the refraction index of the single fθ lens.

3. The single fθ lens of claim 1, wherein the ratio of the largest spot and the smallest spot size satisfies the conditions of:

$$0.2 < \delta = \frac{\min(S_b \cdot S_a)}{\max(S_b \cdot S_a)};$$

wherein, $S_a$ and $S_b$ are the lengths of any spot formed by a scan light on the target in the main scanning direction and the sub scanning direction, and δ is the ratio of the smallest spot and the largest spot on the target.

4. The single fθ lens of claim 1, wherein the ratio of the largest spot on the target and the smallest spot on the target satisfies the conditions of:

$$\eta_{max} = \frac{\max(S_b \cdot S_a)}{(S_{b0} \cdot S_{a0})} < 0.25;$$

$$\eta_{min} = \frac{\min(S_b \cdot S_a)}{(S_{b0} \cdot S_{a0})} < 0.1;$$

wherein, $S_{a0}$ and $S_{b0}$ are the lengths of a spot formed by a scan light on a reflecting surface of the MEMS reflecting minor in the main scanning direction and the sub scanning direction, and $S_a$ and $S_b$ are the lengths of any spot formed by a scan light on on the target in the main scanning direction and the sub scanning direction, and $\eta_{max}$ is the maximum ratio value of the largest spot on the target with the spot on the reflecting surface of the MEMS reflecting minor, and $\eta_{min}$ is the minmum ratio value of the largest spot on the target with the spot on the reflecting surface of the MEMS reflecting mirror.

* * * * *